United States Patent [19]

Grauel et al.

[11] Patent Number: 4,585,278
[45] Date of Patent: Apr. 29, 1986

[54] BRAKE SYSTEM FOR VEHICLE COMBINATIONS

[75] Inventors: Ingolf Grauel, Vaihingen/Enz; Werner Stumpe, Kornwestheim, both of Fed. Rep. of Germany

[73] Assignee: Robert Bosch GmbH, Stuttgart, Fed. Rep. of Germany

[21] Appl. No.: 665,260

[22] Filed: Oct. 26, 1984

[30] Foreign Application Priority Data

Dec. 24, 1983 [DE] Fed. Rep. of Germany ....... 3346919

[51] Int. Cl.⁴ .......................... B60T 8/02; B60T 13/66
[52] U.S. Cl. .......................................... 303/7; 303/15; 303/119
[58] Field of Search ........................................ 303/7–8, 303/47, 6 R, 6 A, 13–15, 20, 28–30, 9, 71, 50, 52, 22A, 119, 113, 118, 3, 6 M, 16–17, 25–27; 188/3 R, 151 A

[56] References Cited

U.S. PATENT DOCUMENTS 4,436,347 3/1984 Stumpe ................................ 303/6 R

FOREIGN PATENT DOCUMENTS 0067923 12/1982 European Pat. Off. ................ 303/7
0088911 9/1983 European Pat. Off. .............. 303/15
3124479 12/1982 Fed. Rep. of Germany .......... 303/7

*Primary Examiner*—Douglas C. Butler
*Attorney, Agent, or Firm*—Edwin E. Greigg

[57] ABSTRACT

A brake system for combinations of vehicles in which a truck tractor and/or trailer (semi-trailer) is or are equipped with a supplementary electrical brake system. By the particular embodiment of the brake system, it is possible to couple a truck tractor, with or without an electrical brake system, to a trailer, with or without an electrical brake system, without infringing safety regulations.

1 Claim, 1 Drawing Figure

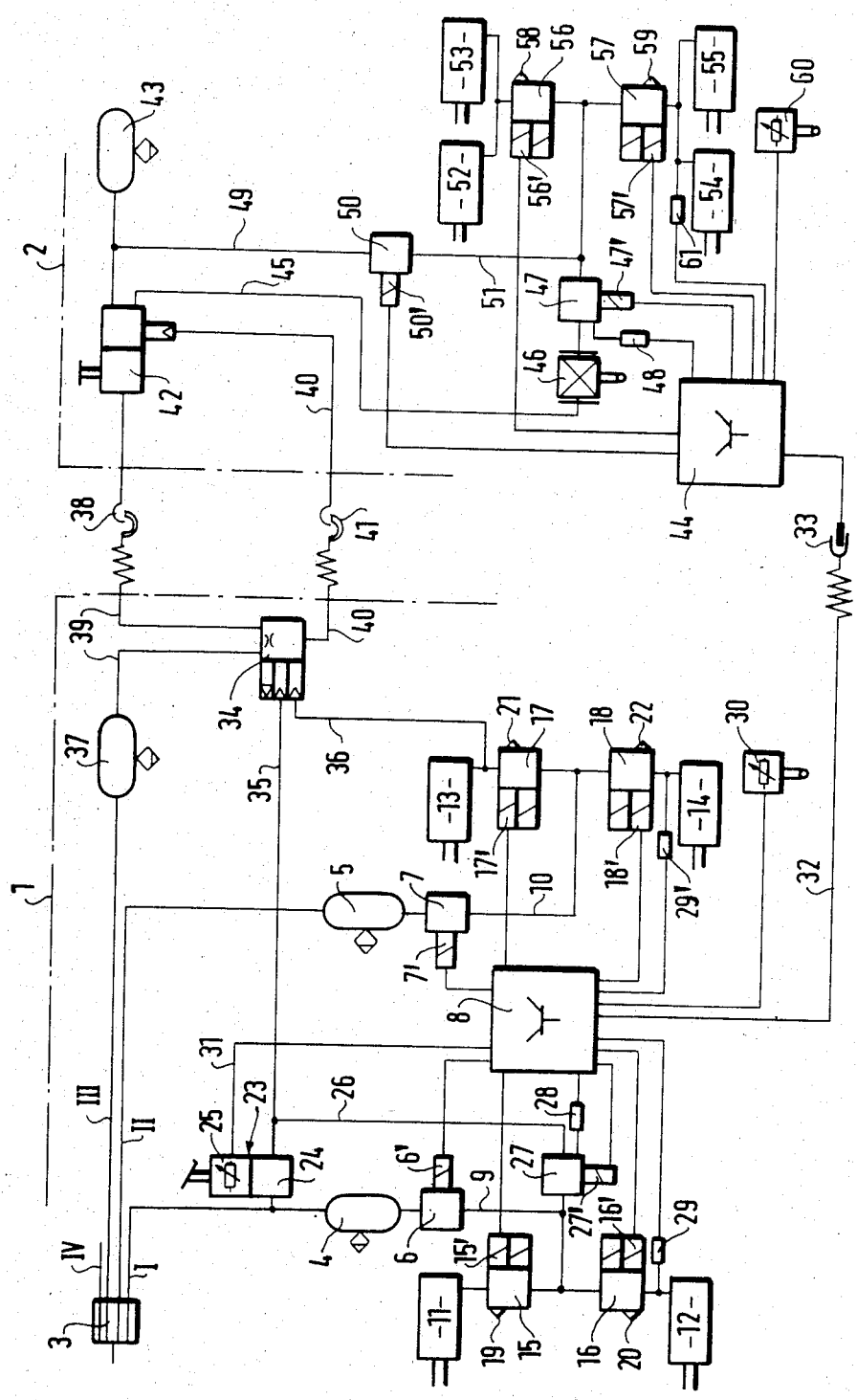

BRAKE SYSTEM FOR VEHICLE COMBINATIONS

BACKGROUND OF THE INVENTION

The invention relates to a brake system for combinations of vehicles.

One problem in a modern brake system of a known type is that it must be capable of being combined with the conventional, standard pneumatic brake systems. For instance if single vehicles (truck tractors, or trailers or semi-trailers) are to be coupled to other single vehicles, of which only one has a modern brake system with supplementary electrical triggering, then the brake systems of such vehicle combinations must be capable of being operated in arbitrary combinations. Thus, it must be possible to couple a standard two-line-brake trailer or an electropneumatically brakable trailer to an electromagnetically brakable tractor vehicle. Conversely, however, it must also be possible to operate an electropneumatically brakable trailer with a standard two-line brake tractor vehicle, because it cannot be presumed that all tractor vehicles will be at the same stage of technological development at the same time. Nor can retrofitting be demanded immediately.

OBJECT AND SUMMARY OF THE INVENTION

The vehicle combination brake system according to the invention has the advantage over the prior art that combinations of vehicles can be connected together in any desired combination, no matter whether the individual vehicles are equipped with a standard two-line brake or an electropneumatic brake.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing illustrates an exemplary embodiment of the invention.

DESCRIPTION OF THE PREFERRED EMBODIMENT

A combination of vehicles comprises a truck tractor 1 and a semi-trailer 2. Each part 1 and 2 of the combination has its own brake system. The brake system of the truck tractor 1 has a compressor (not shown), to which a four-circuit protection valve 3 is connected. The four-circuit protection valve functions to divide the compressed air from the compressor into four different outputs with each of the outputs at a desired pressure. From this protection valve 3, four brake circuits I, II, III and IV are supplied. Brake circuits I and II are operating brake circuits; they serve to supply the brakes of the truck tractor. Brake circuit III is a trailer supply circuit, and brake circuit IV has an auxiliary consumer connected to it (not shown), which forms no part of this invention.

One supply container 4 and 5 such as an accumulator is located in each of the two operating brake circuits I and II, respectively, and each container is followed by a respective 2/2-way magnetic valve 6 and 7. One electro-magnet control 6' and 7' of each magnetic valve 6 and 7 is connected to an electronic switching device 8 which is triggered by signals from transducers 25, 28, 29, 29', 30, and which processes these signals and then emits adjusting (in the sense of "control" or "positioning") pulses to the magnets 6', 7', 17', 18', 16', 27' and to the trailer line 32. From the magnetic valves 6 and 7, one brake line 9 or 10 each leads to two front axle brake cylinders 11 and 12 and two rear axle brake cylinders 13 and 14. Elements 6 and 7 are 2/2-way magnetic valves, which are electrically actuated, the armatures of which can assume two positions. In one position (without electric current), one pneumatic line passage (line 9 or 10) is closed; in the other position (with current), one line passage (line 9 or 10) is opened. Near the brake cylinders 11, 12, 13, 14, electronically actuated monitoring valves 15, 16 and 17, 18, respectively, are inserted into the respective brake line 9 or 10 and are actuated by respective electro-magnets 15', 16' and 17', 18'. The monitoring valves 15, 16, 17, 18 are arranged to permit a flow through them when no current is being applied to the electro-magnets and when the electro-magnets are activated they block off flow from lines 9, 10 and relieve the brake cylinders 11, 12 or 13, 14 via a respective bleeding connection 19, 20, and 21, 22. The magnets 15', 16', 17', 18' are likewise connected to the electronic switching device 8 and controlled thereby (not identified by a reference numeral) next to each of the magnets 15', 16', 17' and 18' also represents magnets, which however are part of an anti-skid braking apparatus, and which, just like the magnets 15', 16', 17', 18', can then monitor the air passage through the valves 15, 16, 17, 18. The anti-skid feature forms no part of this invention.

A brake signal element 23 is a foot-actuated braking signal transducer, which can control an electrical current and pneumatic line similar to a pneumatic dual-circuit foot-operated brake valve, except that one brake circuit is controlled electrically for instance, by means of a potentiometer, element 25, while the pneumatic line is controlled as in the pneumatic dual circuit valve. The pneumatic element 24 is connected to the brake circuit I and can trigger a pneumatic signal, via a line 26, which reaches a blocking valve 27. The blocking valve 27 is controlled electro-magnetically by an electro-magnet 27' which in the position of rest (that is without any current applied) keeps the blocking valve 27 open for pneumatic flow through it and which is connected to the switching device 8. When current is applied to the electro-magnet 27' the valve 27 is closed. The existence of a pneumatic pressure in the line is monitored with a pressure sensor 28, which sends a signal to switching device 8. A sensor 29, 29' of the same type is connected to the pneumatic lines prior to the front and rear axle brake cylinders 12, 14 to send a signal to switching device 8 if there is a pneumatic pressure applied thereto.

The electronic switching device 8 additionally is connected with an electrical, load-dependent brake force regulator 30, as well as with the pressure sensors 28, 29, 29' and an electrical control line 32, which leads to an electrical trailer line coupling 33 and via a signal line 31 with the electrical element 25 of the brake signal transducer 23.

Element 30 is a load-dependent brake force regulator. A regulator of this kind usually is mounted on the rear axle, because the change in load is at a maximum there. A regulator of this kind is actuated by the changes in distance between the axle and the vehicle body as the shock absorbers adjust. It (the regulator) is usually located in the brake line which leads to the rear axle brake cylinders 13 and 14 and limits the line passage when the axle load is low. Here, however, the regulator is embodied as an electrical transducer, and it emits a signal to the electronic switching device 8 depending on the degree of rear axle shock absorber adjustment (that is, depending on the axle load); the electronic switching device 8 processes the signal such that at low axle load, less braking pressure is directed into the brake cylinders.

At the end of the truck tractor 1 is disposed a trailer control valve 34, which is triggerable via a line 35 which is controlled by the pneumatic line control 24 in brake circuit I, and via a line 36 which is connected with a pneumatic pressure line of brake circuit II and furthermore by a spring-actuated brake circuit, not shown. The trailer control valve monitors a trailer supply line 39, which leads from the supply circuit III via a container or accumulator 37 to a trailer supply line coupling 38, and it furthermore monitors a trailer brake line 40, which leads to a trailer brake line coupling 41.

Element 34 is a quite usual trailer control valve, which is actuatable by means of a pressure increase applied to the two lower boxes via the line 35 and 36 (front axle and rear axle braking pressure) and by means of a pressure drop (upper box) upon actuation of the truck tractor parking brake, and after element 34 is switched over, the element 34 causes reserve air from the line 39 to reach the trailer brake line 40 in order to brake the trailer.

Located on the semi-trailer 2 are a trailer brake valve 42, a trailer supply container 43 and as in the truck tractor an electronic switching device 44.

Element 42 is a conventional two-line trailer braking valve, which independently of the pressure in the trailer brake line 40 causes the pressure stored in the reservoir 43 to reach the trailer brakes.

From the trailer brake valve 42, a brake line 45 leads via a well known load-dependent brake force regulator 46 to a blocking valve 47 having an electromagnet 47', which is connected to the switching device 44. Here again a sensor 48 monitors whether a pressure signal is present.

A supply line 49 leads to a 2/2-way magnetic valve 50, which is actuatable by an electro-magnet 50' connected to the switching device 44. From the magnetic valve 50, a brake line 51 leads to four brake cylinders 52, 53, 54, 55 of the semi-trailer wheels, the brake cylinders 52, 53, 54, 55 being connected in pairs. Each pair 52/53 or 54/55 is monitored by a respective monitoring valve 56 or 57, which is actuated by a respective electro-magnet 56' or 57'. The monitoring valves 56, 57 are arranged to allow a flow through them when they have no current and when their electro-magnets 56', 57' are activated they block inflow and relieve the brake cylinders 52, 53, 54, 55 via respective bleeding connections 58 or 59. Also located on the semi-trailer 2 is an electrical, load-dependent brake force regulator 60, and a further sensor 61 is also disposed on the brake cylinder pair 54/55.

The mode of operation of elements 44, 47, 48, 50, 56, 57 and 60 corresponds to those of the truck tractor.

MODE OF OPERATION

From the design of the brake systems of the truck tractor 1 and the semi-trailer 2, it is clear that the brake is a dual-circuit, two-line brake, in which in addition to the usual pneumatic control line and supply, a second control line, in the form of the electrical control line 32, is also provided between the two vehicles.

This second control line 32 begins at the electronic switching device 8, which derives its control signal from the electrical element 25 of the brake value transducer 23. In the actuation of the brake value transducer 23, which takes place simultaneously in both elements 24 and 25, the electrical braking signal is faster than the pneumatic one, so that the pneumatic pressure signal is held back at the blocking valve 27. In this manner, braking is usually effected electrically at the front and rear wheels of the truck tractor 1 via the magnetic valves 6 and 7. Only if the electrical system fails does the blocking valve 27 open, the blocking valve is open when there is no current—and permits compressed air from the line 26 to enter the brake cylinders 11 and 12 of the front axle; at the rear axle, braking does not take place, which is sufficient in cases of emergency.

At the semi-trailer, braking is preferably effected with electrical triggering via the reversible magnetic valve 50, but if the electrical system fails braking is also effected pneumatically via the blocking valve 47, which is open to permit pneumatic flow when there is no current applied to the electro-magnet of valve 47.

If a semi-trailer 2, the brake system of which is designed purely pneumatically in the conventional manner, is coupled to the truck tractor 1, then the electrical control line 32 is not coupled, and the semi-trailer is braked only pneumatically, via its trailer brake valve.

Conversely, a truck tractor which has a brake system without electricity can also be coupled with a semi-trailer 2 which is equipped with a supplementary electrical brake.

The invention is not limited to a particular vehicle combination comprising a truck tractor and a semi-trailer. On the contrary, it is applicable to other combinations in which a primary vehicle is secured to a secondary vehicle in tandem.

The foregoing relates to a preferred exemplary embodiment of the invention, it being understood that other variants and embodiments thereof are possible within the spirit and scope of the invention, the latter being defined by the appended claim.

What is claimed and desired to be secured by Letters Patent of the United States is:

1. A brake system for controlling brakes on a primary and a secondary vehicle in tandem in which:
   said primary vehicle includes at least three pneumatic pressure lines operatively connected in said brake system for operating and controlling brakes on said primary and said secondary vehicle;
   a foot operated braking signal transducer which includes means for controlling an electrical signal to an electronic switching device and means for controlling one of said pneumatic pressure lines;
   2/2 way magnetic valves for electrically controlling pneumatic pressure from said one pneumatic pressure line to said brakes on said primary vehicle;
   electromagnetic blocking valves on said primary vehicle for blocking pneumatic pressure from said one pneumatic pressure line to said brakes on said primary vehicle during operation of said 2/2 way magnetic valves for applying pneumatic pressure to said brakes on said primary vehicle;
   an electronic switching device on said primary vehicle for processing different electrical signals and providing an output for controlling said 2/2 way magnetic valves and for producing a control signal for said secondary vehicle;

a pneumatic control valve on said primary vehicle which is controlled by pneumatic pressure on said primary vehicle for controlling pneumatic pressure over first and second pneumatic pressure lines to said secondary vehicle;

and said secondary vehicle includes pneumatic operated brake circuits which are connected to said first and second pneumatic pressure lines on said primary vehicle for pneumatic operation of brakes on said secondary vehicle and means for connecting an electrically operated brake circuit on said secondary vehicle to said control signal on said primary vehicle produced for said secondary vehicle.

* * * * *